(12) United States Patent
Paik et al.

(10) Patent No.: US 9,660,737 B2
(45) Date of Patent: May 23, 2017

(54) METHOD OF SUPPORTING MULTI-FREQUENCY BANDS AND ELECTRONIC DEVICE SUPPORTING THE SAME

(71) Applicant: Samsung Electronics Co., Ltd., Suwon-si, Gyeonggi-do (KR)

(72) Inventors: Min Chull Paik, Gumi-si (KR); Hyun Hee Kim, Suwon-si (KR); Na Young Hwang, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 0 days.

(21) Appl. No.: 14/705,389

(22) Filed: May 6, 2015

(65) Prior Publication Data

US 2015/0326261 A1 Nov. 12, 2015

(30) Foreign Application Priority Data

May 9, 2014 (KR) .................. 10-2014-0055399

(51) Int. Cl.
*H01Q 11/12* (2006.01)
*H04B 1/04* (2006.01)
*H04M 1/00* (2006.01)
*H04B 15/04* (2006.01)
*H04B 1/10* (2006.01)
*H04B 1/18* (2006.01)

(52) U.S. Cl.
CPC .............. *H04B 15/04* (2013.01); *H04B 1/04* (2013.01); *H04B 1/1027* (2013.01); *H04B 1/18* (2013.01)

(58) Field of Classification Search
CPC .... H04B 1/005; H04B 1/0053; H04B 1/0057; H04B 1/006; H03H 7/465
USPC .................. 455/188.1, 552.1–553.1, 323
See application file for complete search history.

(56) References Cited

U.S. PATENT DOCUMENTS

| | | | |
|---|---|---|---|
| 6,466,768 B1 * | 10/2002 | Agahi-Kesheh | H04B 1/005 330/133 |
| 6,584,304 B1 * | 6/2003 | Norholm | H04B 1/005 455/188.1 |
| 7,155,193 B2 * | 12/2006 | Rowe | H04B 1/406 455/114.2 |
| 7,266,345 B2 | 9/2007 | Park | |
| 7,386,278 B2 * | 6/2008 | Sato | H04B 1/006 455/73 |
| 7,609,221 B2 | 10/2009 | Chung et al. | |
| 7,729,674 B2 * | 6/2010 | Shie | H04B 1/18 455/201 |
| 8,559,893 B2 * | 10/2013 | Przadka | H04B 1/0057 455/83 |
| 2003/0040282 A1 | 2/2003 | Park | |
| 2004/0014435 A1 * | 1/2004 | Woo | H04B 1/406 455/103 |

(Continued)

FOREIGN PATENT DOCUMENTS

KR 10-2008-0028613 A 4/2008

*Primary Examiner* — Simon Nguyen
(74) *Attorney, Agent, or Firm* — Jefferson IP Law, LLP

(57) ABSTRACT

An electronic device which operates in response to multi-frequency bands is provided. The electronic device includes an antenna, a reception module configured to amplify a signal received through the antenna and distribute the amplified signal according to the multi-frequency bands, and a circuit unit configured to process signals included in the multi-frequency bands.

17 Claims, 11 Drawing Sheets

(56) References Cited

U.S. PATENT DOCUMENTS

| | | | |
|---|---|---|---|
| 2004/0266378 A1* | 12/2004 | Fukamachi | H03H 7/0115 455/188.1 |
| 2005/0085260 A1* | 4/2005 | Ella | H04B 1/0057 455/552.1 |
| 2007/0066245 A1* | 3/2007 | Snider | H04B 1/48 455/78 |
| 2008/0074341 A1 | 3/2008 | Chung et al. | |
| 2013/0016633 A1 | 1/2013 | Lum et al. | |
| 2013/0154761 A1* | 6/2013 | Ilkov | H03H 7/465 333/101 |
| 2015/0018043 A1* | 1/2015 | Taniuchi | H03H 7/465 455/561 |
| 2015/0304059 A1* | 10/2015 | Zuo | H04J 1/08 370/343 |

\* cited by examiner

METHOD OF SUPPORTING MULTI-FREQUENCY BANDS AND ELECTRONIC DEVICE SUPPORTING THE SAME

CROSS-REFERENCE TO RELATED APPLICATION(S)

This application claims the benefit under 35 U.S.C. §119(a) of a Korean patent application filed on May 9, 2014 in the Korean Intellectual Property Office and assigned Serial number 10-2014-0055399, the entire disclosure of which is hereby incorporated by reference.

TECHNICAL FIELD

The present disclosure relates to an apparatus for processing signals with respective frequency bands in an electronic device for supporting multi-frequency bands and a method of supporting the same.

BACKGROUND

An electronic device, such as a smart phone or a tablet computer, may transmit and receive radio signals with an external device and may perform various functions. Further, an electronic device may transmit and receive signals corresponding to not only one frequency band but also multi-frequency bands.

When an electronic device of the related art corresponds to multi-frequency bands, it may transmit a signal to its internal circuit through a separate signal line corresponding to each frequency band. In this case, as the number of corresponding frequency bands is increased, the number of corresponding signal lines in the electronic device may also increase. Therefore, because a mounting space in which the signal lines are mounted is increased, there may be problems, such as deterioration in a wireless terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which may operate in response to multi-frequency bands.

In accordance with an aspect of the present disclosure, an electronic device which operates in response to multi-frequency bands is provided. The electronic device includes an antenna, a reception module configured to amplify a signal received through the antenna and distribute the amplified signal according to the multi-frequency bands, and a circuit unit configured to process signals included in the multi-frequency bands.

In accordance with another aspect of the present disclosure, a signal receiving apparatus is provided. The signal receiving apparatus includes a conversion unit configured to convert a signal received through an antenna of an electronic device, a connection unit including a number of signal lines connected to the conversion unit, and a distribution unit configured to distribute signals transmitted through the connection unit among multi-frequency bands which are processed in an internal circuit of the electronic device.

In accordance with another aspect of the present disclosure, a signal processing method performed in an electronic device is provided. The signal processing method includes converting a signal received through an antenna of the electronic device, transmitting the converted signal through a number of signal lines, distributing the transmitted signals according to corresponding multi-frequency bands in the electronic device, and processing the distributed signals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
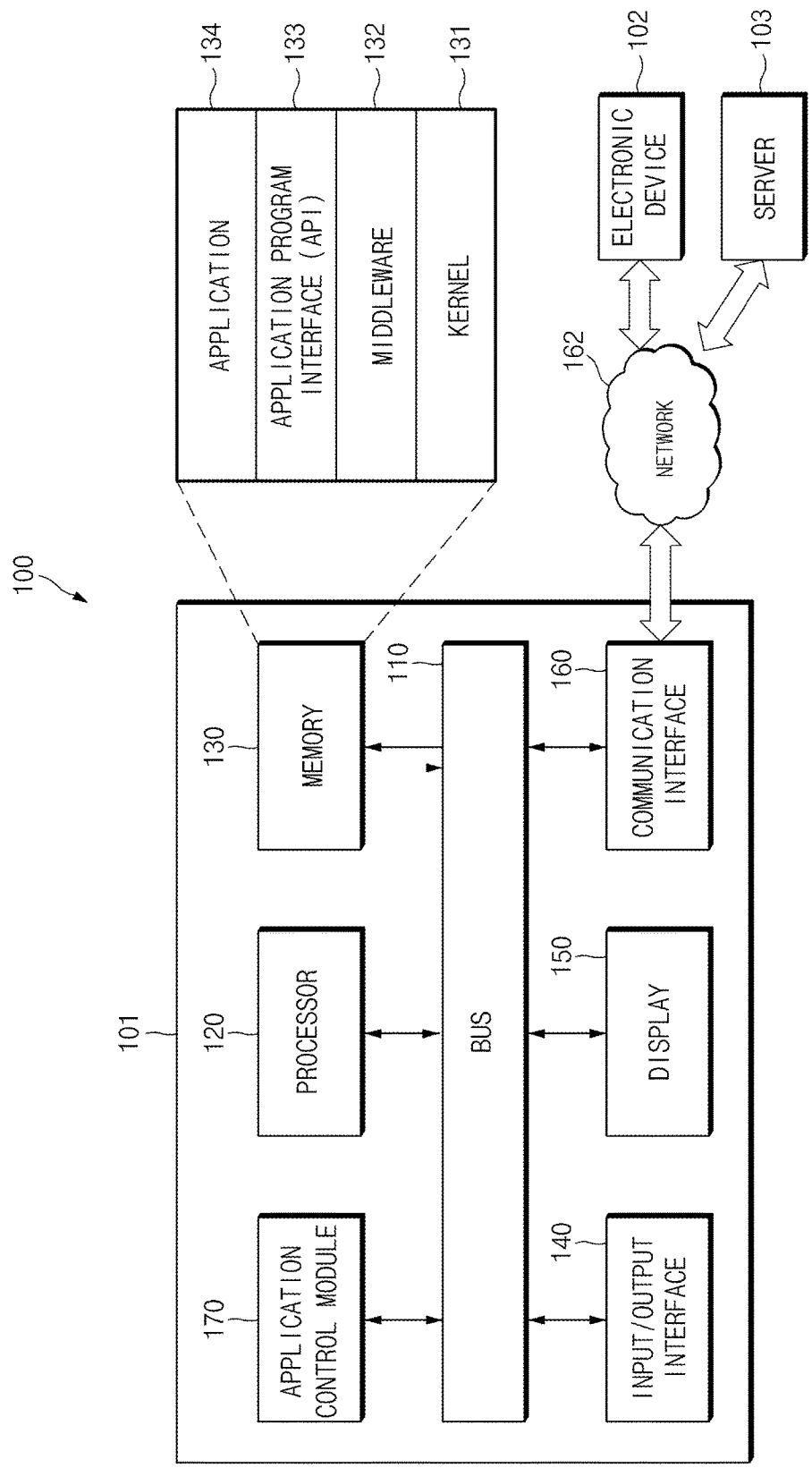
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, the expressions "include" and "comprise" or "may include" and "may comprise" indicate disclosed functions, operations, or existence of elements but do not exclude one or more additional functions, operations or elements. Also, it should be further understood that the terms "include" and "comprise" or "have" as used herein specify the presence of disclosed features, integers, operations, elements, components, or combinations thereof but do not preclude the presence or addition of one or more other features, integers, operations, elements, components, or combinations thereof.

The meaning of the expression "or" used herein includes any or all combinations of the words connected by the term "or". For instance, the expression "A or B" may include A, B, or both A and B.

The expressions such as "1st", "2nd", "first", or "second", and the like used herein may refer to various elements of various embodiments of the present disclosure, but do not limit the corresponding elements. For instance, such expressions do not limit the order and/or priority of the corresponding elements. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

Terms used in this specification are used to describe specified embodiments of the present disclosure and are not intended to limit the scope of the present disclosure.

Unless otherwise defined, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure.

Electronic devices according to various embodiments of the present disclosure may be devices including communication functions. For example, the electronic devices may include at least one of smart phones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses, an electronic apparel, electronic bracelets, electronic necklaces, electronic appcessories, electronic tattoos, and smart watches), and the like.

According to various embodiments of the present disclosure, the electronic devices may be smart home appliances including communication functions. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, and electronic picture frames.

According to various embodiments of the present disclosure, the electronic devices may include at least one of medical devices (e.g., a magnetic resonance angiography (MRA), a magnetic resonance imaging (MRI), a computed tomography (CT), scanners, ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), and points of sales (POSs).

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, wave meters, and the like). The electronic devices according to various embodiments of the present disclosure may be one or more combinations of the above-mentioned devices. Furthermore, the electronic devices according to various embodiments of the present disclosure may be flexible devices. It should be obvious to those skilled in the art that electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a network environment including an electronic device according to various embodiments of the present disclosure.

Referring to FIG. 1, an electronic device 101 may include a bus 110, a processor 120, a memory 130, an input and output interface 140, a display 150, a communication interface 160, and an application control module 170.

The bus 110 may be a circuit which may connect the above-mentioned components with each other and may transmit communication (e.g., a control message) between the above-mentioned components.

For example, the processor 120 may receive instructions from the above-mentioned other components (e.g., the memory 130, the input and output interface 140, the display 150, the communication interface 160, the application control module 170, and the like) through the bus 110. Further, the processor 120 may decode the received instructions, and may perform calculation or data processing according to the decoded instructions.

The memory 130 may store instructions or data which are received from the processor 120 or other components (e.g., the input and output interface 140, the display 150, the communication interface 160, or the application control module 170, and the like) or are generated by the processor 120 or the other components. The memory 130 may include programming modules, such as a kernel 131, a middleware 132, an application programming interface (API) 133, an application(s) 134, and the like. The above-mentioned respective programming modules may be configured with software, firmware, hardware, or at least two or more combinations thereof.

The kernel 131 may control or manage system resources (e.g., the bus 110, the processor 120, or the memory 130, and the like) used to execute an operation or function implemented in the other programming modules, for example, the middleware 132, the API 133, or the application 134. Also, the kernel 131 may provide an interface which may access a separate component of the electronic device 101 in the middleware 132, the API 133, or the application 134 and may control or manage the separate component.

The middleware 132 may play a role as a go-between such that the API 133 or the application 134 communicates with the kernel 131 and transmits and receives data. Also, the middleware 132 may perform control (e.g., scheduling or load balancing) with respect to work requests using a method of assigning priority which may use system resources (the bus 110, the processor 120, or the memory 130, and the like) of the electronic device 101 to, for example, at least one of the application(s) 134, in association with the work requests received from the application 134.

The API 133 may be an interface in which the application 134 controls a function provided from the kernel 131 or the middleware 132. For example, the API 133 may include at least one interface or function (e.g., an instruction) for file control, window control, image processing, text control, and the like.

According to various embodiments of the present disclosure, the applications 134 may include a short message service (SMS)/multimedia message service (MMS) application, an e-mail application, a calendar application, an alarm application, a health care application (e.g., an application for measuring quantity of exercise or blood sugar, and the like), or an environment information application (e.g., an application for providing atmospheric pressure information, humidity information, or temperature information, and the like), and the like. Additionally or alternatively, the application 134 may be an application associated with exchanging information between the electronic device 101 and an external electronic device (e.g., an electronic device 102 or a server 103). The application associated with exchanging the information may include, for example, a notification relay application for transmitting designated information to the external electronic device or a device management application for managing the external electronic device.

For example, the notification relay application may include a function of transmitting notification information, which is generated by another application (e.g., the SMS/MMS application, the e-mail application, the health care application, or the environment information application, and the like) of the electronic device 101, to the external electronic device (e.g., the electronic device 102 or the server 103). Additionally or alternatively, the notification relay application may receive notification information from, for example, the external electronic device (e.g., the electronic device 102 or the server 103), and may provide the received notification information to a user of the electronic device 101. For example, the device management application may manage (e.g., install, delete, or update) a function (e.g., a function of turning on/off the external electronic device itself (or partial components) or a function of adjusting brightness (or resolution) of the display 150) for at least a part of the external electronic device (e.g., the electronic device 102 or the server 103) which communicates with the electronic device 101, an application which operates in the external electronic device, or a service (e.g., a call service or a message service) provided from the external electronic device.

According to various embodiments of the present disclosure, the application 134 may include an application specified according to attributes (e.g., a kind of the electronic device) of the external electronic device (the electronic device 102 or the server 103). For example, when the external electronic device is an MP3 player, the application 134 may include an application associated with playing music. Similarly, when the external electronic device is a mobile medical device, the application 134 may include an application associated with health care. According to an embodiment of the present disclosure, the application 134 may include at least one of an application specified in the electronic device 101 and an application received from the external electronic device (e.g., the electronic device 102 or the server 103).

The input and output interface 140 may transmit instructions or data input from the user through an input and output device (e.g., a sensor, a keyboard, or a touch screen) to, for example, the processor 120, the memory 130, the communication interface 160, or the application control module 170 through the bus 110. For example, the input and output interface 140 may provide data about a touch of the user, which is input through the touch screen, to the processor 120. Also, the input and output interface 140 may output instructions or data received from, for example, the processor 120, the memory 130, the communication interface 160, or the application control module 170 through the bus, through the input and output device (e.g., a speaker or the display 150). For example, the input and output interface 140 may output voice data processed through the processor 120 to the user through the speaker.

The display 150 may display a variety of information (e.g., multimedia data, or text data, and the like) to the user.

The communication interface 160 may perform communication between the electronic device 101 and the external electronic devices (e.g., the electronic device 102 or the server 103). For example, the communication interface 160 may connect to a network 162 through wireless communication or wire communication and may communicate with the external electronic device. The wireless communication may include at least one of, for example, Wi-Fi communication, Bluetooth (BT) communication, near field communication (NFC), GPS communication, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like). The wire communication may include at least one of a universal serial bus (USB), a high definition multimedia interface (HDMI), a recommended standard 232 (RS-232), and a plain old telephone service (POTS).

An additional description will be given later for a configuration of the communication interface 160 with reference to FIG. 2.

According to an embodiment of the present disclosure, the network 162 may be a telecommunications network. The telecommunications network may include at least one of a computer network, the Internet, the Internet of things, and a telephone network. According to an embodiment of the present disclosure, protocols (a transport layer protocol, a data link layer protocol, or a physical layer protocol, and the like) for communication between the electronic device 101 and the external electronic device may be supported in at least one of the application 134, the API 133, the middle ware 132, the kernel 131, and the communication interface 160.

The application control module 170 may process at least some of information obtained from other elements (e.g., the processor 120, the memory 130, the input and output interface 140, or the communication interface 160, and the like), and may provide the processed information to the user by various methods. The application control module 170 may select and control applications to obtain information various sensors or elements which are mounted in the electronic device 101 or to process information obtained therefrom.

Figure 2:
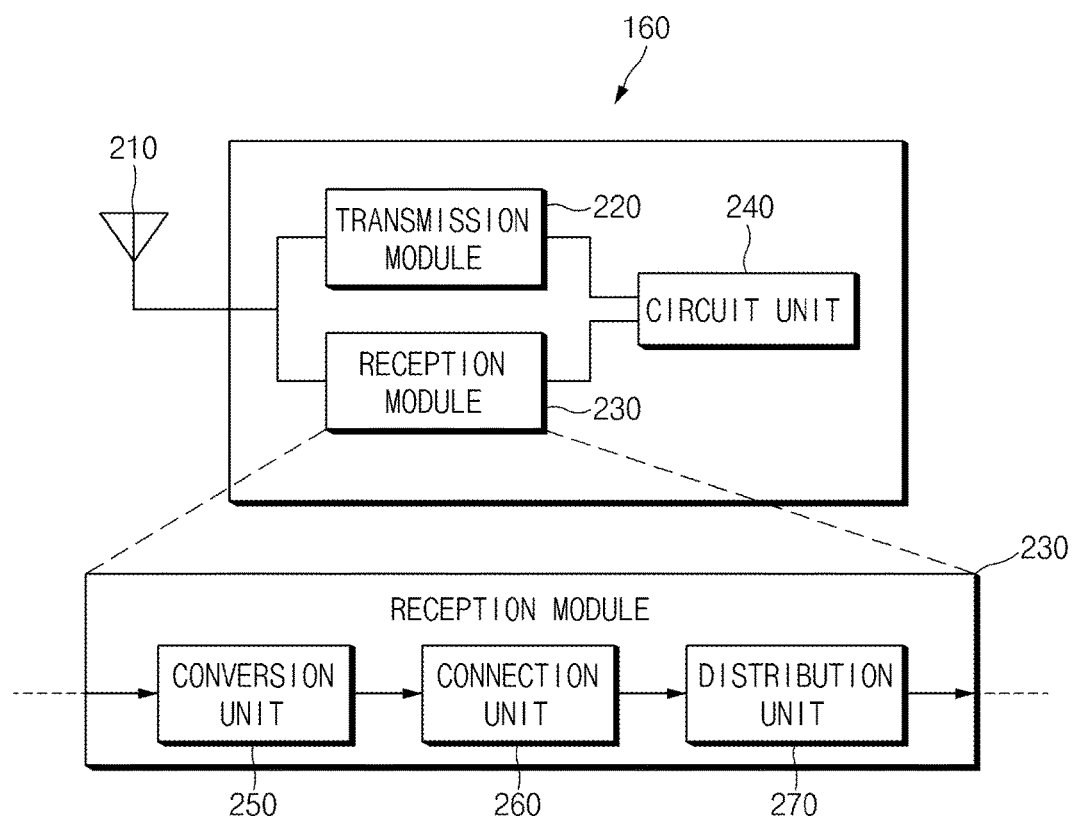
FIG. 2 is a block diagram illustrating a communication interface according to various embodiments of the present disclosure.

FIG. 2 is a block diagram illustrating a communication interface according to various embodiments of the present disclosure.

Referring to FIG. 2, a communication interface 160 may include an antenna 210, a transmission module 220, a reception module 230, and a circuit unit 240. Herein, the reception module 230 or the transmission module 220 may be only separated according to its function, and may be implemented with a shape in which partial elements are shared or may be implemented with one chip.

The antenna 210 may transmit and receive a signal (e.g., a radio frequency (RF) signal) for an electronic device 101 of FIG. 1. The antenna 210 may transmit a signal processed through the transmission module 220 to an external electronic device (e.g., an electronic device 102 or a server 103 of FIG. 1) through a network 162 of FIG. 1 in the electronic device 101. Also, the antenna 210 may receive a signal of a specified frequency band from the external electronic device. The reception module 230 may process the received signal and may provide the processed signal to the circuit unit 240 (e.g., an RF integrated circuit (RFIC)).

The transmission module 220 may process a signal and transmit the processed signal to the external electronic device (e.g., the electronic device 102 or the server 103) through the antenna 210. The transmission module 220 may generate a transmission signal suitable for communication environments of the network 162 by performing conversion, such as amplification or filtering, with respect to a data signal provided from the circuit unit 240.

The reception module 230 may perform conversion, such as filtering or amplification, with respect to a signal received through the antenna 210 and may provide the converted signal to the circuit unit 240. In various embodiments of the present disclosure, the reception module 230 may receive signals of various frequency bands from the external electronic device (e.g., the electronic device 102 or the server 103). The reception module 230 may classify the received signals into signals included in frequency bands which may be processed in the circuit unit 240, and may provide the classified signals to the circuit 240.

In various embodiments of the present disclosure, the reception module 230 may include a conversion unit 250, a connection unit 260, and a distribution unit 270. The conversion unit 250 may filter or amplify a signal received through the antenna 210. The conversion unit 250 may reduce or remove a noise signal from the signal received through the antenna 210. Also, the conversion unit 250 may amplify the signal received through the antenna 210 to complement power lost in an internal transmission process. An additional description will be given later for the conversion unit 250 with reference to FIG. 3.

The connection unit 260 may transmit the signal converted through the conversion unit 250 to the distribution unit 270. The connection unit 260 may correspond to physical wires which transmit electric signals. In various embodiments of the present disclosure, the connection unit 260 may be implemented with a number which is less than the number of frequency bands which may be processed in the circuit unit 240. For example, when the circuit unit 240 may process signals with first to fourth frequency bands, the connection unit 260 may be implemented with two signal lines (e.g., a high signal line and a low signal line) or three signal lines (e.g., a high signal line, a middle signal line, and a low signal line) which is less than the number of frequency bands which may be processed in the circuit 240. An additional description will be given later for the connection unit 260 with reference to FIG. 9.

The distribution unit 270 may distribute the signal transmitted through the connection unit 260 according to frequency bands which may be processed in the circuit unit 240. For example, when the circuit unit 240 may process signals with first to fourth frequency bands, the distribution unit 270 may determine whether the received signal is a signal included in any of the first to fourth frequency bands and may provide the determined signal to the circuit 240.

The circuit unit 240 may process signals included in multi-frequency bands. The circuit unit 240 may allow the electronic device 101 to efficiently correspond to various network environments in response to various frequency bands. In various embodiments of the present disclosure, the circuit unit 240 may be configured to be separated from a processor 120 of FIG. 1, or may be implemented with a module included in the processor 120.

FIG. 2 illustrates an example when the reception module 230 functionally includes the connection unit 260 or the distribution unit 270. However, the scope and spirit of the present disclosure may not be limited thereto. For example, the connection unit 260 or the distribution unit 270 may be implemented to be separated from the reception module 230. For example, the connection unit 260 may be implemented with independent signal lines which connect the reception module 230 with the circuit unit 240. Also, the distribution unit 270 may be implemented with an independent configuration which performs a function for distributing signals between the connection unit 260 and the circuit unit 240, or may be implemented with a module included in the circuit 240.

Figure 3:
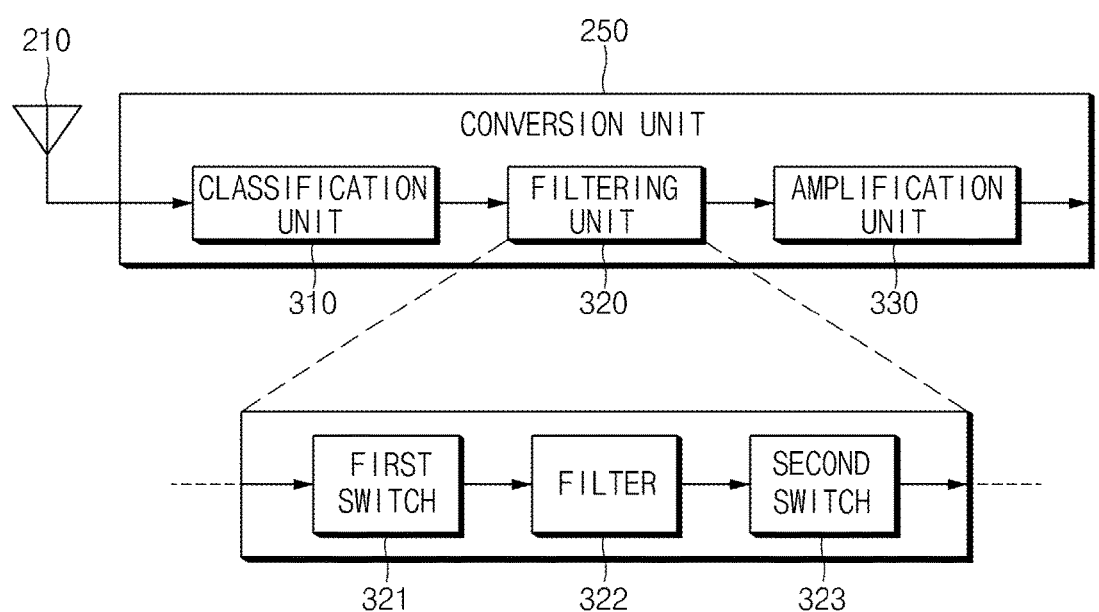
FIG. 3 is a block diagram illustrating a conversion unit according to various embodiments of the present disclosure.

FIG. 3 is a block diagram illustrating a conversion unit according to various embodiments of the present disclosure.

Referring to FIG. 3, a conversion unit 250 may include a classification unit 310, a filtering unit 320, and an amplification unit 330.

The classification unit 310 may classify a signal received through an antenna 210 according to specified intervals. The intervals may be preset, or may be determined by reflecting a frequency distribution range of the received signal. For example, the classification unit 310 may classify the signal received through the antenna 210 as signals of two specified high and low intervals or signals of three specified high, middle, and low intervals. The classified signals may be transmitted to a circuit unit 240 of FIG. 2 through a connection unit 260 of FIG. 2, through a filtering or amplification process.

In various embodiments of the present disclosure, the classification unit 310 may set the interval to correspond to the number of signal lines included in the connection unit 260. For one example, when there are two signal lines included in the connection unit 260, the classification unit may classify a frequency band interval into two high and low intervals. For another example, when there are three signal lines included in the connection unit 260, the classification unit 310 may classify a frequency band interval into three high, middle, and low intervals.

The filtering unit 320 may filter the signals included in the intervals classified through the classification unit 310, respectively. In various embodiments of the present disclosure, the filtering unit 320 may include a first switch 321, a filter 322, and a second switch 323.

The first switch 321 may select the filter 322 with a frequency band of a signal to be received and may connect an input terminal of the filter 322 with the classification unit 310. For example, when four signals to be received are included in a high interval, the first switch 321 may connect input terminals of the filter 322, corresponding to the respective signals, with the classification unit 310 through four switches (e.g., single-pole-four-throw (SP4T) switches).

The filter 322 may perform filtering for removing unnecessary signals, such as noise signals included in the respective frequency signals.

The second switch 323 may selectively provide the filtered signals to the amplification unit 330 through its switching. The second switch 323 may selectively connect output terminals of the filter 322 to the amplification unit 330. In various embodiments of the present disclosure, the second switch 323 may be implemented with switching elements which are same as that of the first switch 321. For example, when the first switch 321 is implemented using SP4T switches, the second switch 323 may be also implemented using SP4T switches.

The amplification unit 330 may amplify the filtered signals. The amplification unit 330 may complement power loss which may be generated while the signals are transmitted to the circuit 240 through the connection unit 260. The signals amplified through the amplification unit 330 may be provided to a distribution unit 270 of FIG. 2 and the circuit unit 240 through the connection unit 260.

Figure 4:
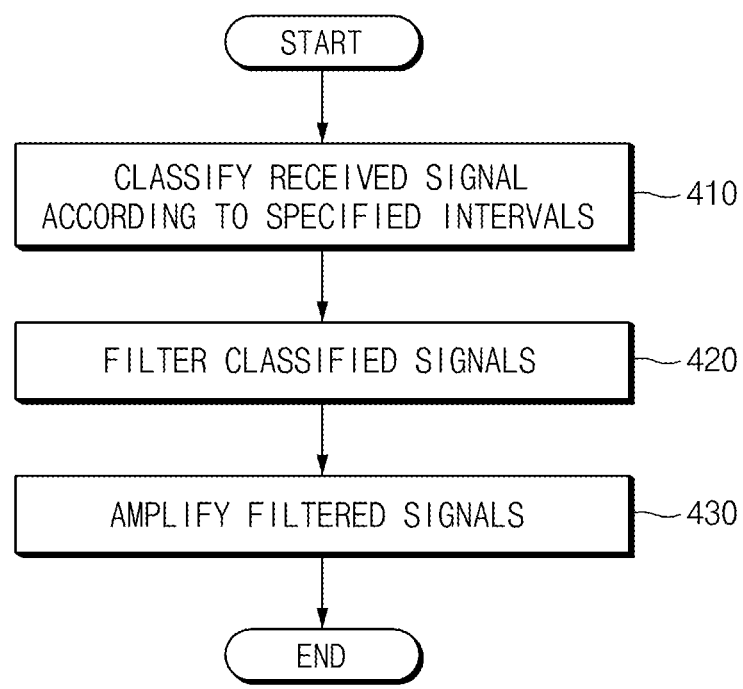
FIG. 4 is a flowchart illustrating an operating method of a conversion unit according to various embodiments of the present disclosure.

FIG. 4 is a flowchart illustrating an operating method of a conversion unit according to various embodiments of the present disclosure.

Referring to FIG. 4, in operation 410, a classification unit 310 of FIG. 3 may classify a signal received through an antenna 210 of FIG. 3 according to specified intervals. The intervals may be preset, or may be determined by reflecting a frequency distribution range of the received signal. In various embodiments of the present disclosure, the classification unit 310 may be implemented using a diplexer, a triplexer, and the like.

According to various embodiments of the present disclosure, the classification unit 310 may classify the signal received through the antenna 210 into a number of signal intervals that is less than the number of frequency bands which may be processed in a circuit unit 240 of FIG. 2. For example, when the circuit unit 240 may operate to correspond to each of first to fourth frequency bands, the classification unit 310 may classify the interval as two intervals (e.g., a high interval and a low interval) or three intervals (e.g., a high interval, a middle interval, and a low interval). In this case, because the number of signal lines corresponding to the respective intervals, which are included in the connection unit 260 may be less than the number of frequency bands which may be processed in the circuit unit 240, a space on printed circuit board (PCB) for disposing the signal lines may be reduced.

In operation 420, a filtering unit 320 of FIG. 3 may filter signals included in the respective intervals classified through the classification unit 310. The filtering unit 320 may include a first switch 321, a filter 322, and a second switch 323 of FIG. 3. In various embodiments of the present disclosure, the second switch 323 may switch signals to correspond to the number of signal lines included in the connection unit 260. For example, when two signal lines (e.g., the high signal line and the low signal line) are included in the connection unit 260, the second switch 323 may classify and switch a frequency signal of a high interval and a frequency signal of a lower interval from the signal received through the antenna 210.

In operation 430, an amplification unit 330 of FIG. 3 may amplify the filtered signals. In various embodiments of the present disclosure, the amplification unit 330 may be implemented with low noise amplifiers (LNAs) connected to the second switch 323.

Figure 5:
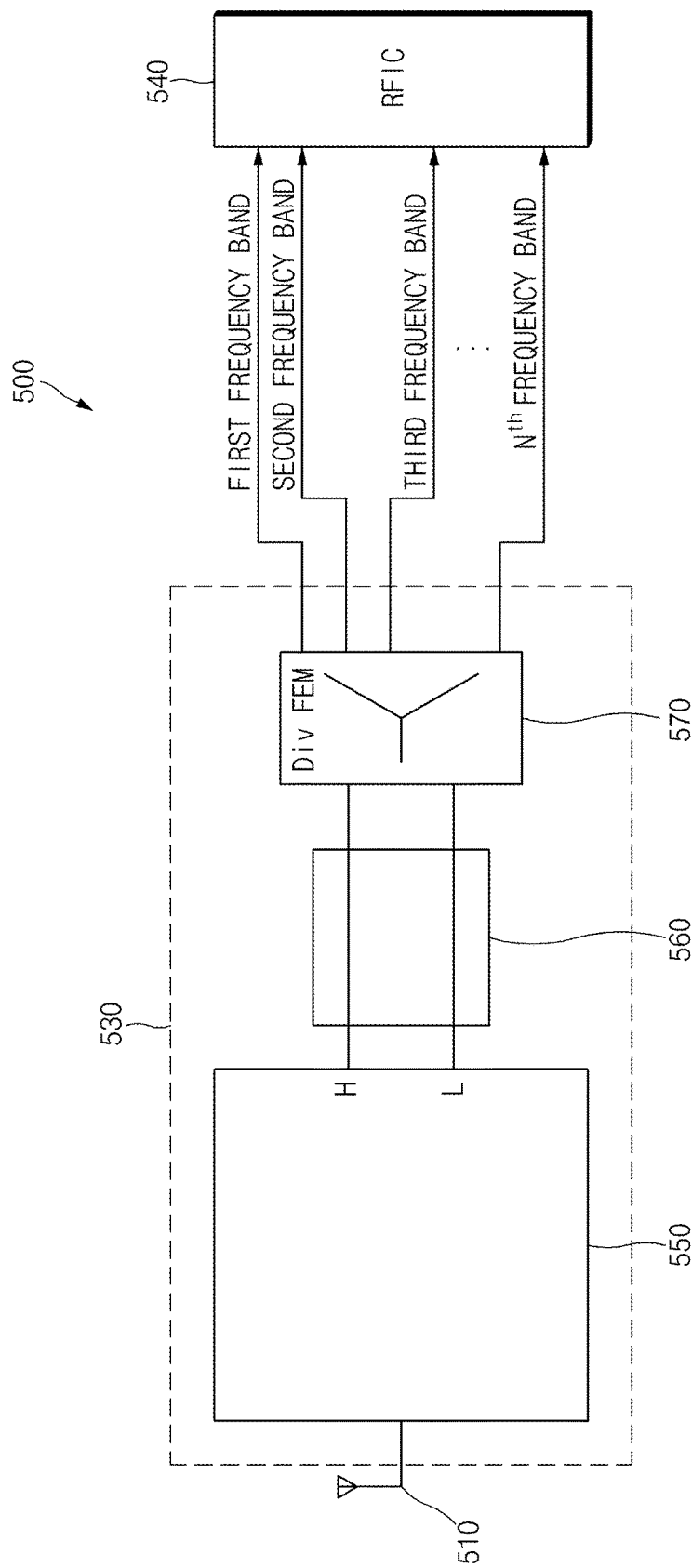
FIG. 5 is a block diagram illustrating a communication interface unit according to various embodiments of the present disclosure.

FIG. 5 is a block diagram illustrating a communication interface unit according to various embodiments of the present disclosure.

Referring to FIG. 5, a communication interface 500 may include an antenna 510, a reception module 530, and a circuit unit 540. The reception module 530 may include a conversion unit 550, a connection unit 560, and a distribution unit 570.

The conversion unit 550 may classify a signal received through the antenna 510 according to two specified intervals (e.g., a high interval and a low interval). Signals included in the respective intervals may be filtered and amplified, and the amplified signals may be transmitted to the circuit unit 540 (e.g., an RFIC) through the connection unit 560. FIG. 5 illustrates an example when the conversion unit 550 classifies the signal according to the two intervals (e.g., the high interval and the low interval). However, the scope and spirit of the present disclosure may not be limited thereto.

The connection unit 560 may include two signal lines corresponding to the two specified intervals (e.g., the high interval and the low interval). FIG. 5 illustrates an example when the connection unit 560 includes the two signal lines. However, the scope and spirit of the present disclosure may not be limited thereto. For example, the number of signal lines may be increased according to the number of specified intervals.

The distribution unit 570 may distribute the signals transmitted through the connection unit 560 according to frequency bands which may be processed in the circuit unit 540. The distribution unit 570 may be implemented with a diversity front end module (Div FEM). The distribution unit 570 may determine whether the received signals are signals included in any of N (N is the number of frequency bands which may be supported in an electronic device 101 of FIG. 1) frequency bands which may be processed in the circuit unit 540, and may provide the determined signals to the circuit unit 540. According to the related art, because a distribution unit is disposed before a connection unit, N signal lines are formed to correspond to N frequency bands. However, the signal lines included in the connection unit 560 according to an embodiment of the present disclosure may be formed according to only a number (e.g., 2) corresponding to the intervals (e.g., the high interval and the low interval) classified through the conversion unit 550 in the electronic device 101 according to various embodiments of the present disclosure.

Figure 6A:
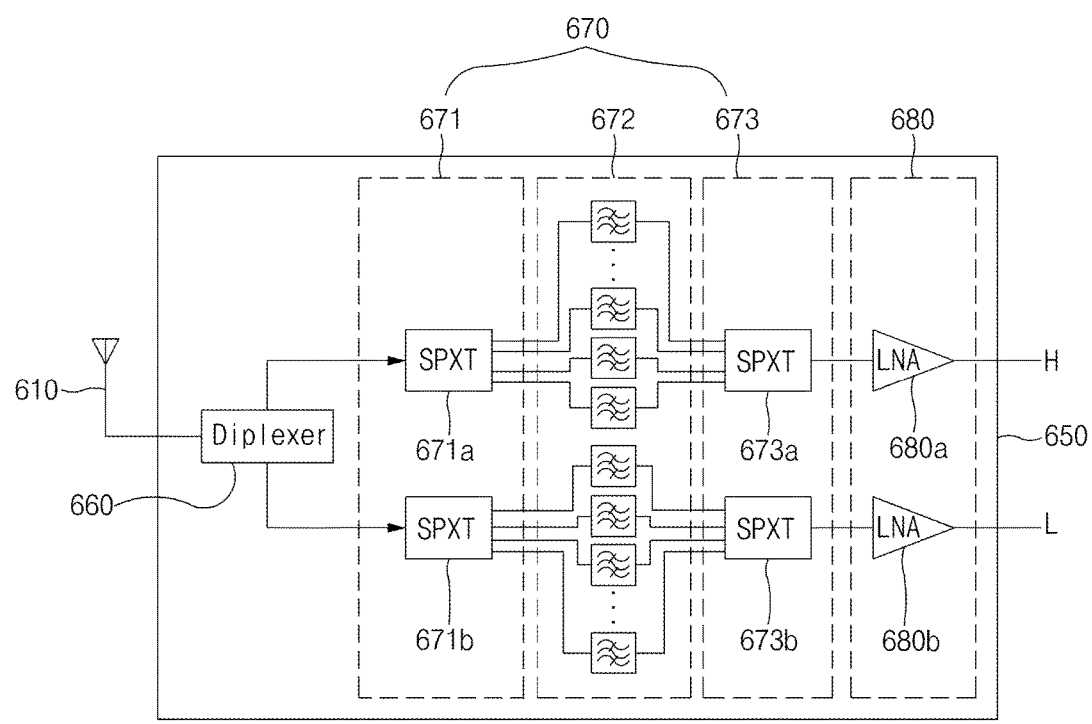
FIG. 6A is a block diagram illustrating a conversion unit of a two-interval type according to various embodiments of the present disclosure.

FIG. 6A is a block diagram illustrating a conversion unit of a two-interval type according to various embodiments of the present disclosure.

Referring to FIG. 6A, a conversion unit 650 may include a classification unit 660, a filtering unit 670, and an amplification unit 680.

The classification unit 660 may classify a signal received through an antenna 610 according to specified intervals. The intervals may be preset, or may be determined by reflecting a frequency distribution range of the received signal. The classification unit 660 may classify the signal received through the antenna 610 into signals of two specified high and low intervals. The classification unit 660 may be implemented with a diplexer.

The filtering unit 670 may filter the signals included in the high and low intervals classified through the classification unit 660, respectively. The filtering unit 670 may include a first switch 671, a filter 672, and a second switch 673.

The first switch 671 may select the filter 672 of frequency bands of signals to be received, which are included in the high and low intervals, and may connect input terminals of the filter 672 with the classification unit 660. A switch 671a of the first switch 671 may switch respective frequency signals included in the high interval. A switch 671b of the first switch 671 may switch respective frequency signals included in the low interval.

The filter 672 may perform filtering for removing unnecessary signals, such as noise signals included in the respective frequency signals.

The second switch 673 may selectively provide the filtered signals to the amplification unit 680 through its switching. The second switch 673 may selectively connect output terminals of the filter 672 to the amplification unit 680. A switch 673a of the second switch 673 may switch frequency signals of the high interval. A switch 673b of the second switch 673 may switch frequency signals of the low interval.

The amplification unit 680 may amplify the filtered signals. An amplifier 680a of the amplification unit 680 may connect to the switch 673a and may amplify the frequency signals of the high interval. An amplifier 680b of the amplification unit 680 may connect to the switch 673b and may amplify the frequency signals of the low interval. The amplification unit 680 may complement power loss which may be generated while the signal is transmitted to a circuit 240 of FIG. 2 through a connection unit 260 of FIG. 2.

Figure 6B:
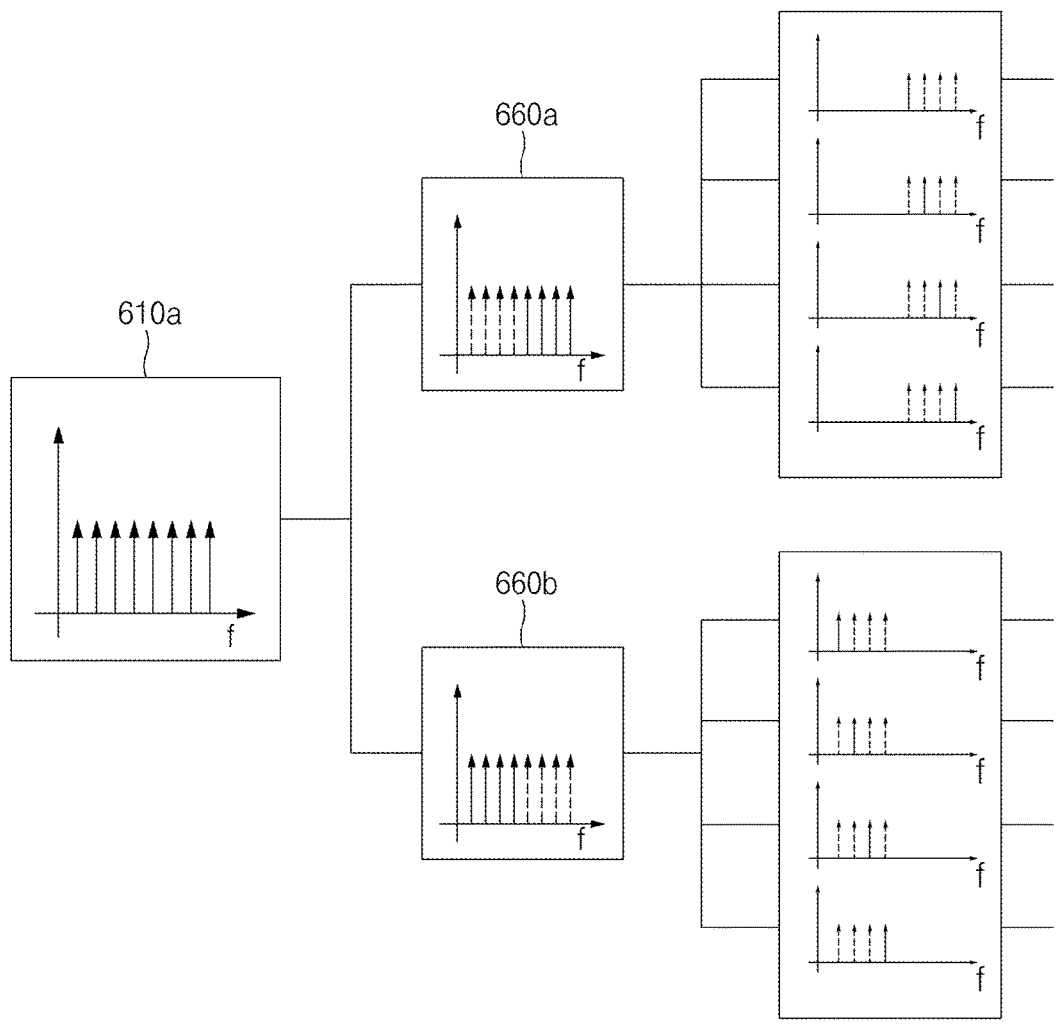
FIG. 6B is a drawing illustrating a signal conversion process of a conversion unit according to various embodiments of the present disclosure.

FIG. 6B is a drawing illustrating a signal conversion process of a conversion unit according to various embodiments of the present disclosure.

Referring to FIG. 6B, a signal 610a received through the antenna 610 may include a plurality of frequency signals. The classification unit 660 may classify the signals 660a of an upper interval into signals of a high interval in the signal 610a and may classify signals 660b of a lower interval into signals of a low interval in the signal 610a.

The first switch 671 may switch four frequency signals included in the high interval, respectively, and may switch four frequency signals included in the low interval, respectively. The switch 671a may switch the four frequency signals included in the high interval, respectively. The switch 671b may switch the four signals included in the low interval, respectively. The switched signals may be transmitted to the circuit 240 through a filtering or amplification process. FIG. 6B illustrates an example when the four frequency signals are included in each of the high and low intervals. However, the scope and spirit of the present disclosure may not be limited thereto.

Figure 7:
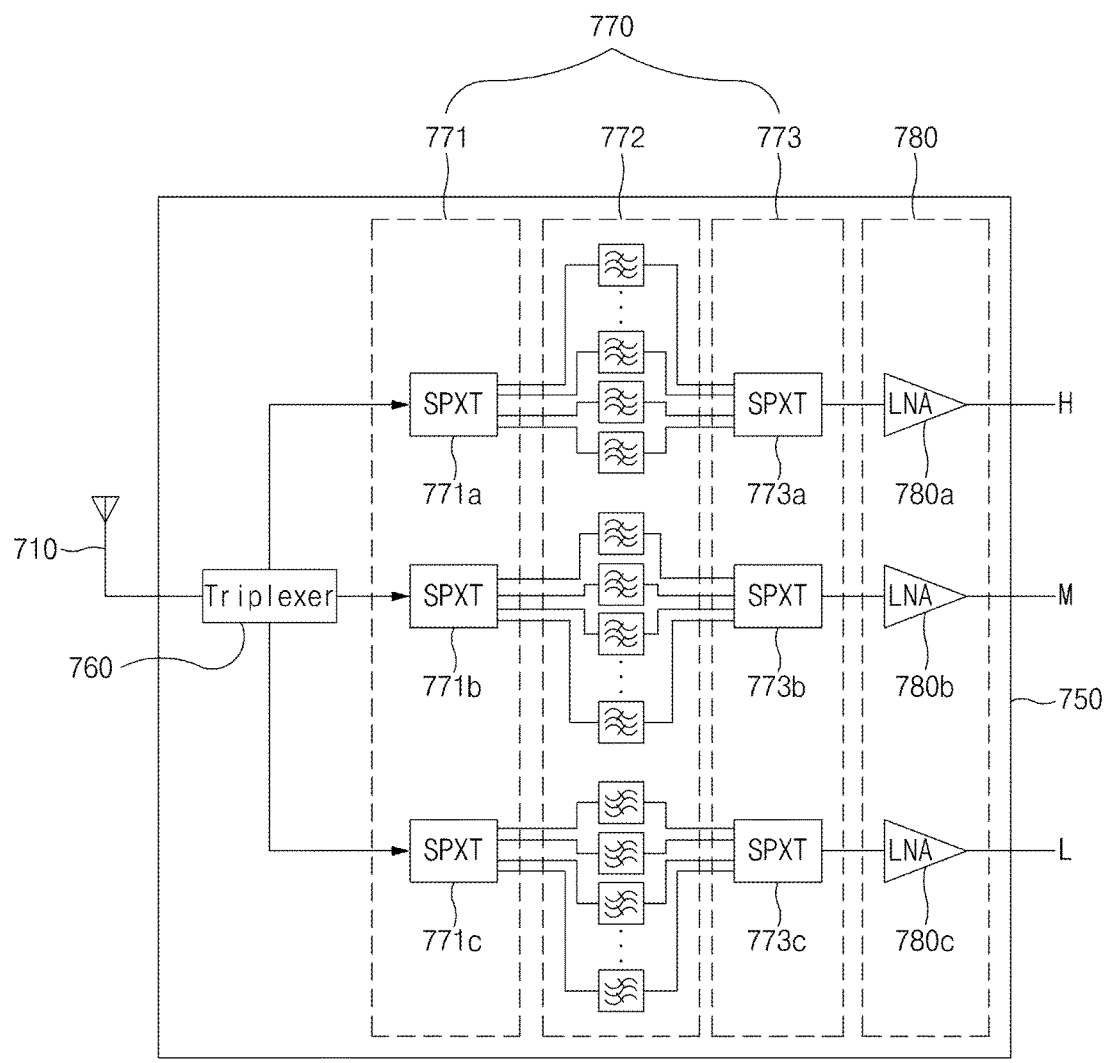
FIG. 7 is a block diagram illustrating a conversion unit of a three-interval type according to various embodiments of the present disclosure.

FIG. 7 is a block diagram illustrating a conversion unit of a three-interval type according to various embodiments of the present disclosure.

Referring to FIG. 7, a conversion unit 750 may include a classification unit 760, a filtering unit 770, and an amplification unit 780.

The classification unit 760 may classify a signal received through an antenna 710 according to specified intervals. The intervals may be preset, or may be determined by reflecting a frequency distribution range of the received signal. The classification unit 760 may classify the signal received through the antenna 710 into signals included in three specified high, middle, and low intervals. The classification unit 760 may be implemented with a triplexer.

The filtering unit 770 may filter the signals included in the high, middle, and low intervals classified through the classification unit 760, respectively. The filtering unit 770 may include a first switch 771, a filter 772, and a second switch 773.

The first switch 771 may select the filter 772 with frequency bands of signals to be received, which are included in the high, middle, and low intervals, and may connect input terminals of the filter 772 with the classification unit 760. A switch 771a of the first switch 771 may switch respective frequency signals included in the high interval. A switch 771b of the first switch 771 may switch respective frequency signals included in the middle interval. A switch 771c of the first switch 771 may switch respective frequency signals included in the low interval.

The filter 772 may perform filtering for removing unnecessary signals, such as noise signals included in the respective frequency signals.

The second switch 773 may selectively provide the filtered signals to the amplification unit 780 through its switching. The second switch 773 may selectively connect output terminals of the filter 772 to the amplification unit 780. A switch 773a of the second switch 773 may switch frequency signals of the high interval. A switch 773b of the second switch 773 may switch frequency signals of the middle interval. A switch 773c of the second switch 773 may switch frequency signals of the low interval.

The amplification unit 780 may amplify the filtered signals. An amplifier 780a of the amplification unit 780 may connect to the switch 773a and may amplify the frequency signals of the high interval. An amplifier 780b of the amplification unit 780 may connect to the switch 773b and may amplify the frequency signals of the middle interval. An amplifier 780c of the amplification unit 780 may connect to the switch 773c and may amplify the frequency signals of the low interval. The amplification unit 780 may complement power loss which may be generated while the signal is transmitted to a circuit 240 of FIG. 2 through a connection unit 260 of FIG. 2.

Figure 8:
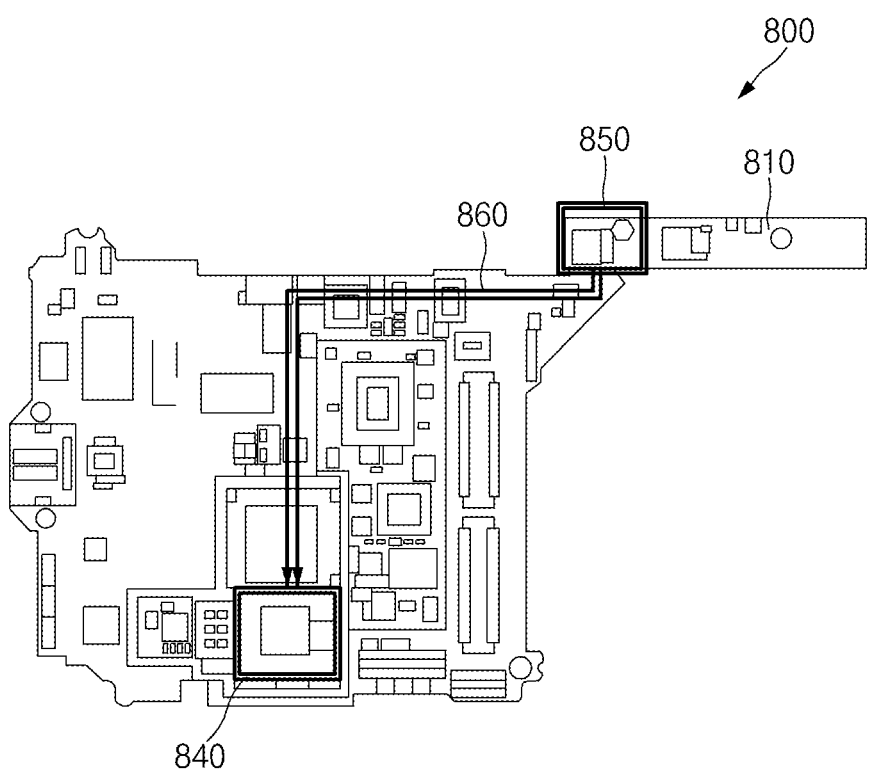
FIG. 8 is a drawing illustrating an implementation example of an electronic device according to various embodiments of the present disclosure.

FIG. 8 is a drawing illustrating an implementation example of an electronic device according to various embodiments of the present disclosure.

Referring to FIG. 8, an electronic device 800 may include an antenna 810, a conversion unit 850, a connection unit 860, and a circuit unit 840. Although it is not shown in FIG. 8, the electronic device 800 may further include a distribution unit between the connection unit 860 and the circuit unit 840. In various embodiments of the present disclosure, the distribution unit may be implemented to be included as a module in the circuit unit 840.

The antenna 810 may receive a signal (e.g., an RF signal) for the electronic device 800. The conversion unit 850 may be disposed to be adjacent to or otherwise nearby the antenna 810, and may filter or amplify the signal received through the antenna 810.

The connection unit 860 may provide the signal converted through the conversion unit 850 to the circuit unit 840 (or the distribution unit). FIG. 8 illustrates an example when the connection unit 860 includes two signal lines (e.g., a high signal line and a low signal line). However, the scope and spirit of the present disclosure may not be limited thereto.

The respective signal lines included in the connection unit 860 may be shielded in all directions by dielectric materials to prevent interference or influence with or on peripheral circuits or wires, and the like. The more the number of signal lines included in the connection unit 860 may be increased, the more a space in which the corresponding signal lines are mounted may be increased. Also, interference or influence with or on peripheral signals may be increased. In various embodiments of the present disclosure, the connection unit 860 may be implemented with a number which is less than the number of frequency bands which may be processed in the circuit unit 840. Therefore, the electronic device 800 may enhance space efficiency by reducing the number of signal lines.

The circuit unit 840 (or the distribution unit) may be disposed to be relatively distant from the antenna 810, and may connect with the conversion unit 850 through the physical signal lines (e.g., the connection unit 860) to achieve electric connection. The distribution unit (not shown) may be disposed between the circuit unit 840 and the connection unit 860 and may distribute signals transmitted through the connection unit 860 according to frequency bands which may be processed in the circuit unit 840.

Figure 9:
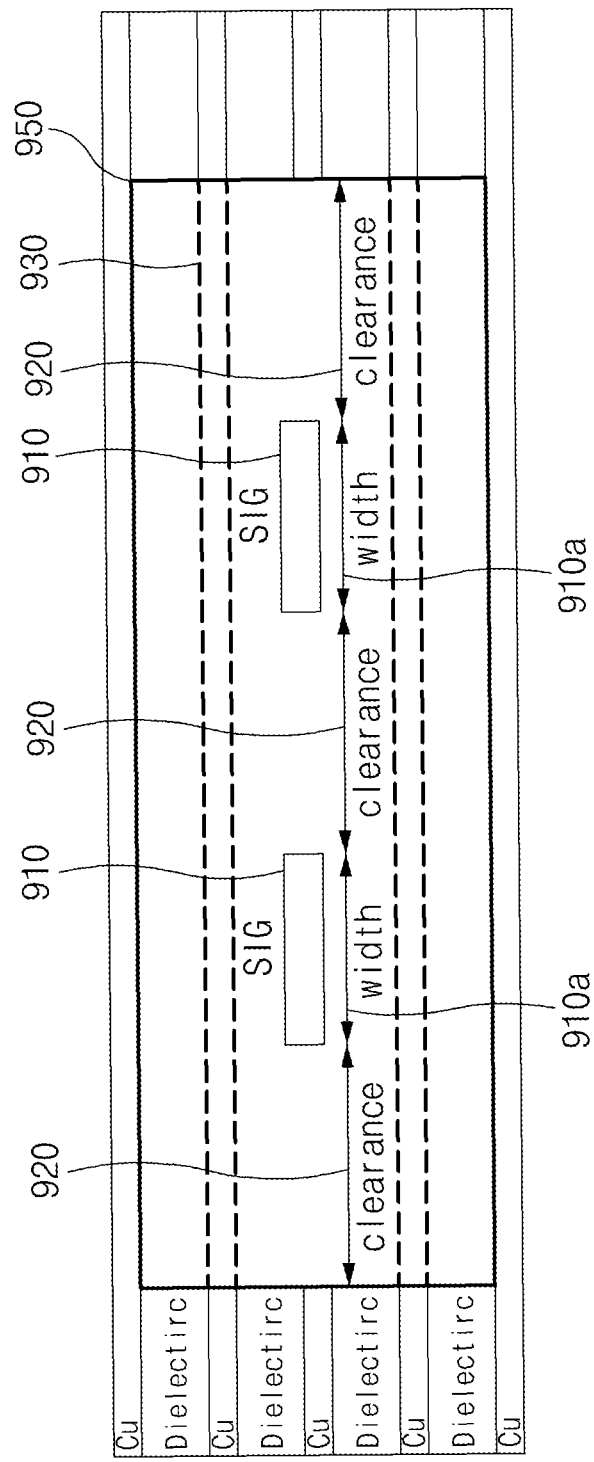
FIG. 9 is a drawing illustrating a connection unit according to various embodiments of the present disclosure.

FIG. 9 is a drawing illustrating a connection unit according to various embodiments of the present disclosure.

Referring to FIG. 9, a connection unit 260 of FIG. 2 may include two signal lines 910 (e.g., a high signal line and a low signal line). The signal lines 910 may be shielded in all directions by dielectric materials to prevent interference or influence with or on peripheral circuits or wires, and the like. In this case, each of the signal lines 910 may form a clearance 920 from a peripheral signal line or a wire region 910*a* to be shielded. Each of the signal lines 910 may reduce influence with another electric signal, which flows in a PCB, through the clearance 920. A shielding region 950 may be expanded to a peripheral region in consideration of a region 930 which is removed by fill-cut.

According to the related art, when a circuit unit is implemented to correspond to first to fourth frequency bands, there is a problem in that four signal lines are needed and a space where the respective signal lines are mounted in a PCB is increased. Also, there is a problem in that the respective signal lines have an influence on wires of other components. On the other hand, in case of various embodiments of the present disclosure, although a number of corresponding frequency bands which may be processed in a circuit unit 240 is increased, the signal lines 910 included in the connection unit 260 may be maintained as a specific number or less (e.g., 2 or 3), thereby enhancing space efficiency in an electronic device 101 of FIG. 1.

According to various embodiments of the present disclosure, the connection unit 260 may be implemented such that two signal lines correspond to one interval. For example, when a conversion unit 250 classifies a signal into signals of two high and low intervals, a first signal line and a second signal line may correspond to the high interval. Also, a third signal line and a fourth signal line may correspond to the low interval. In this case, the first signal line and the second signal line (or, the third signal line and the fourth signal line) may be set to have opposite phases to each other and may be implemented with a shape which is strong to noise.

Figure 10:
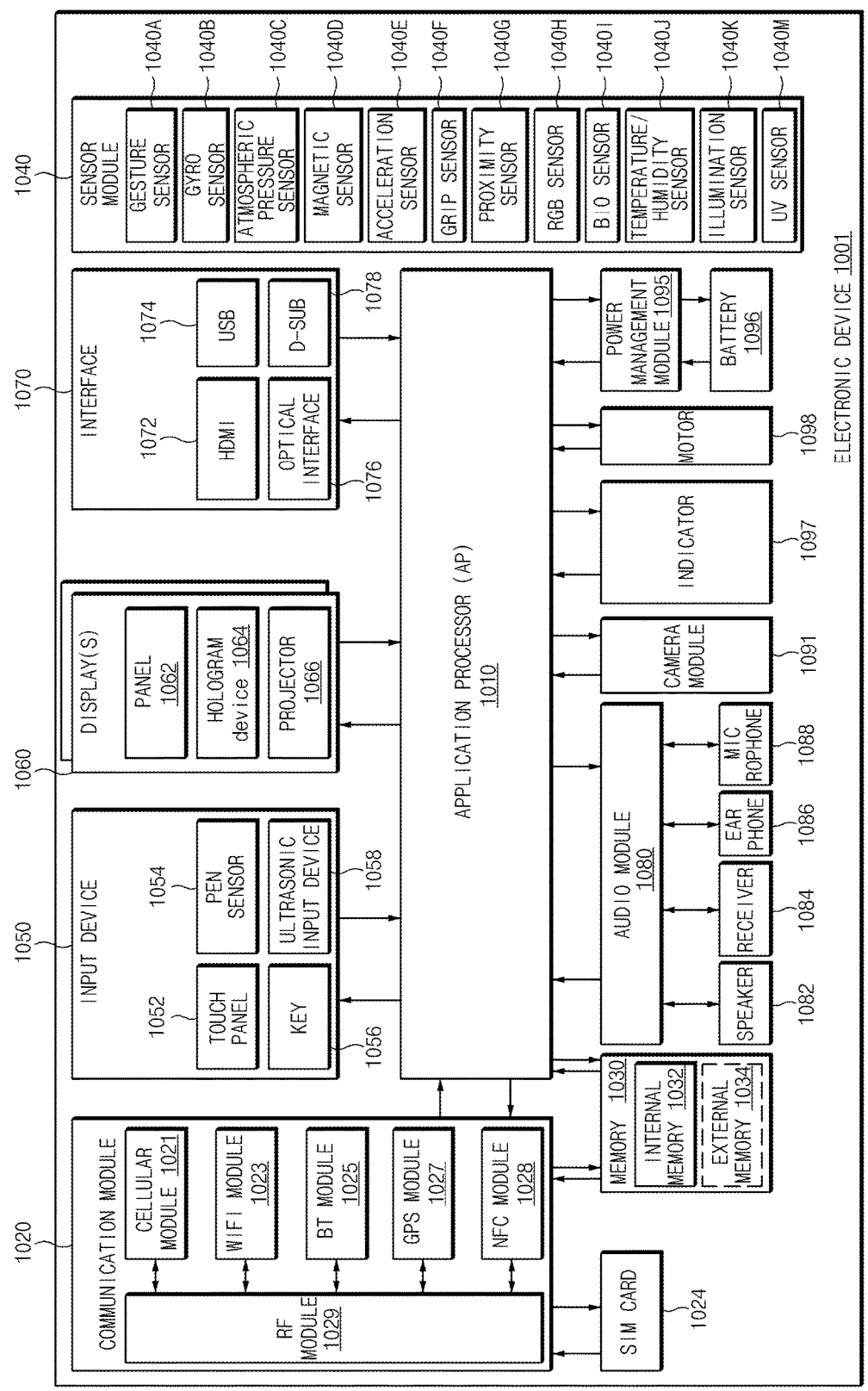
FIG. 10 is a block diagram illustrating an electronic device according to various embodiments of the present disclosure.

FIG. 10 is a block diagram illustrating an electronic device according to various embodiments of the present disclosure.

Referring to FIG. 10, an electronic device 1001 may include one or more application processors (APs) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may run an operating system (OS) or an application program to control a plurality of hardware or software components connected to the AP 1010 and may process and compute a variety of data including multimedia data. The AP 1010 may be implemented with, for example, a system on chip (SoC). According to an embodiment of the present disclosure, the AP 1010 may further include a graphic processing unit (GPU) (not shown).

The communication module 1020 may transmit and receive data through communication between the electronic device 1001 and other electronic devices connected thereto through a network. According to an embodiment of the present disclosure, the communication module 1020 may include a cellular module 1021, a Wi-Fi module 1023, a BT module 1025, a GPS module 1027, an NFC module 1028, and an RF module 1029.

The cellular module 1021 may provide a voice call service, a video call service, a text message service, or an Internet service, and the like through a communication network (e.g., an LTE network, an LTE-A network, a CDMA network, a WCDMA network, a UMTS network, a WiBro network, a GSM network, and the like). Also, the cellular module 1021 may identify and authenticate an electronic device within a communication network using, for example, a SIM (e.g., the SIM card 1024). According to an embodiment of the present disclosure, the cellular module 1021 may perform at least a part of functions which may be provided by the AP 1010. For example, the cellular module 1021 may perform at least a part of a multimedia control function.

According to an embodiment of the present disclosure, the cellular module 1021 may include a communication processor (CP). Also, the cellular module 1021 may be implemented with, for example, an SoC. Though components such as the cellular module 1021 (e.g., a CP), the memory 1030, or the power management module 1095, and the like are illustrated as being components independent of the AP 1010 in FIG. 10, according to an embodiment of the present disclosure, the AP 1010 may be implemented to include at least a part (e.g., the cellular module 1121) of the above-mentioned components.

According to an embodiment of the present disclosure, the AP 1010 or the cellular module 1021 (e.g., a CP) may load an instruction or data received from nonvolatile memories respectively connected thereto or from at least one of other elements into a volatile memory to process the instruction or data. Also, the AP 1010 or the cellular module 1021 may store data received from at least one of other elements or generated by at least one of other elements in a nonvolatile memory.

Each of the Wi-Fi module 1023, the BT module 1025, the GPS module 1027, and the NFC module 1028 may include, for example, a processor for processing data transmitted and received through the corresponding module. In FIG. 10, an embodiment of the present disclosure is exemplified as the cellular module 1021, the Wi-Fi module 1023, the BT module 1025, the GPS module 1027, and the NFC module 1028 are separate blocks, respectively. However, according to an embodiment of the present disclosure, at least a part (e.g., two or more components) of the cellular module 1021, the Wi-Fi module 1023, the BT module 1025, the GPS module 1027, and the NFC module 1028 may be included in one IC or an IC package. For example, at least a part (e.g., a CP corresponding to the cellular module 1021 and a Wi-Fi processor corresponding to the Wi-Fi module 1023) of processors corresponding to the cellular module 1021, the Wi-Fi module 1023, the BT module 1025, the GPS module 1027, and the NFC module 1028 may be implemented with one SoC.

The RF module 1029 may transmit and receive data, for example, an RF signal. Though not shown, the RF module 1029 may include, for example, a transceiver, a power amplifier module (PAM), a frequency filter, or a low noise amplifier (LNA), and the like. Also, the RF module 1029 may further include a component, for example, a conductor or a conducting wire, and the like for transmitting and receiving an electromagnetic wave in a space in wireless communication. In FIG. 10, an embodiment of the present disclosure is exemplified as the cellular module 1021, the Wi-Fi module 1023, the BT module 1025, the GPS module 1027, and the NFC module 1028 are implemented to share one RF module 1029. However, according to an embodiment of the present disclosure, at least one of the cellular module 1021, the Wi-Fi module 1023, the BT module 1025, the GPS module 1027, and the NFC module 1028 may transmit and receive an RF signal through a separate RF module.

The SIM card 1024 may be a card which includes a SIM, and may be inserted into a slot formed at a specific position of the electronic device. The SIM card 1024 may include unique identification information (e.g., an IC card identifier (ICCID)) or subscriber information (e.g., an international mobile subscriber identity (IMSI)).

The memory 1030 may include an internal (e.g., an embedded) memory 1032 or an external memory 1034. The embedded memory 1032 may include at least one of, for example, a volatile memory (e.g., a dynamic random access memory (DRAM), a static RAM (SRAM), a synchronous dynamic RAM (SDRAM), and the like), or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory, and the like).

According to an embodiment of the present disclosure, the embedded memory 1032 may be a solid state drive (SSD). The external memory 1034 may further include a flash drive, for example, a compact flash (CF), a secure digital (SD), a micro-SD, a mini-SD, an extreme digital (xD), or a memory stick. The external memory 1034 may be functionally connected with the electronic device 1001 through various interfaces. According to an embodiment of the present disclosure, the electronic device 1001 may further include a storage (or a storage medium) such as a hard disk drive.

The sensor module 1040 may measure a physical quantity or may detect an operation state of the electronic device 1001. The sensor module 1040 may convert the measured or detected information to an electric signal. The sensor module 1040 may include at least one of, for example, a gesture sensor 1040A, a gyro sensor 1040B, an atmospheric pressure sensor 1140C, a magnetic sensor 1040D, an acceleration sensor 1040E, a grip sensor 1040F, a proximity sensor 1040G, a color sensor 1040H (e.g., red, green, blue (RGB) sensor), a biosensor 1040I, a temperature/humidity sensor 1040J, an illumination sensor 1040K, an ultraviolet (UV) sensor 1040M, and the like. Additionally or alternatively, the sensor module 1040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), and the like. The sensor module 1040 may further include a control circuit for controlling at least one or more sensors included therein.

The input device 1050 may include a touch panel 1052, a (digital) pen sensor 1054, a key 1056, or an ultrasonic input unit 1058. The touch panel 1052 may recognize a touch input using at least one of, for example, capacitive, resistive, infrared, and ultrasonic detecting methods. Also, the touch panel 1052 may further include a control circuit. In case of the capacitive detecting method, a physical contact or proximity recognition is possible. The touch panel 1052 may further include a tactile layer. In this case, the touch panel 1052 may provide a tactile reaction to a user.

The (digital) pen sensor 1054 may be implemented, for example, using a method, which is the same as or similar to receiving a user touch input, or using a separate sheet for recognition. The key 1056 may include, for example, a physical button, an optical key, or a keypad. The ultrasonic input unit 1058 may be a device, which allows the electronic device 1101 to detect a sound wave using a microphone (e.g., a microphone 1088) and to determine data through an input tool generating an ultrasonic signal, and may enable wireless recognition. According to an embodiment of the present disclosure, the electronic device 1001 may receive a user input from an external electronic unit (e.g., a computer or a server) connected thereto using the communication module 1020.

The display 1060 (e.g., a display module 150 of FIG. 1) may include a panel 1062, a hologram device 1064, or a projector 1066. The panel 1062 may be, for example, a liquid-crystal display (LCD) or an active-matrix organic light-emitting diode (AMOLED), and the like. The panel 1062 may be implemented to be, for example, flexible, transparent, or wearable. The panel 1062 and the touch panel 1052 may be integrated into one module. The hologram device 1064 may show a stereoscopic image in a space using interference of light. The projector 1066 may project light onto a screen to display an image. The screen may be positioned in, for example, the inside or outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-subminiature 1078. The interface 1070 may be included in, for example, a communication interface 160 shown in FIG. 1. Additionally or alternatively, the interface 1070 may include, for example, a mobile high definition link (MHL)

interface, an SD card/multimedia card (MMC) interface, or an infrared data association (IrDA) standard interface.

The audio module 1080 may convert a sound and an electric signal in dual directions. At least partial components of the audio module 1080 may be included in, for example, an input and output interface 140 shown in FIG. 1. The audio module 1080 may process sound information input or output through, for example, a speaker 1082, a receiver 1084, an earphone 1086, or the microphone 1088, and the like.

The camera module 1091 may be a device which shoots a still picture and a moving picture. According to an embodiment of the present disclosure, the camera module 1091 may include one or more image sensors (e.g., a front sensor or a rear sensor), a lens (not shown), an image signal processor (ISP) (not shown), or a flash (not shown) (e.g., an LED or a xenon lamp).

The power management module 1095 may manage power of the electronic device 1001. Though not shown, the power management module 1095 may include, for example, a power management IC (PMIC) a charger IC or a battery, or fuel gauge.

The PMIC may be embedded in, for example, an IC or an SoC semiconductor. A charging method may be classified as a wired charging method or a wireless charging method. The charger IC may charge a battery and may prevent an overvoltage or an overcurrent from being input from a charger. According to an embodiment of the present disclosure, the charger IC may include a charger IC for at least one of the wired charging method and the wireless charging method. The wireless charging method may be, for example, a magnetic resonance method, a magnetic induction method, or an electromagnetic method. An additional circuit for wireless charging, for example, a coil loop, a resonance circuit, or a rectifier, and the like may be further provided.

A battery gauge may measure, for example, the remaining capacity of the battery 1096 and voltage, current, or temperature thereof while the battery 1196 is charged. The battery 1096 may store or generate electricity and may supply power to the electronic device 1001 using the stored or generated electricity. The battery 1096 may include, for example, a rechargeable battery or a solar battery.

The indicator 1097 may display a specific state of the electronic device 1001 or a part (e.g., the AP 1010) thereof, for example, a booting state, a message state, or a charging state, and the like. The motor 1098 may convert an electric signal to mechanical vibration. Though not shown, the electronic device 1001 may include a processing unit (e.g., a GPU) for supporting a mobile TV. The processing unit for supporting the mobile TV may process media data that is based on the standard of, for example, digital multimedia broadcasting (DMB), digital video broadcasting (DVB), or media flow, and the like.

According to various embodiments of the present disclosure, the electronic device may operate in response to multi-frequency bands. The electronic device may include the antenna, the reception module configured to amplify the signal received through the antenna and distribute the signal according the multi-frequency bands, and the circuit unit configured to process the signals included in the multi-frequency bands.

According to various embodiments of the present disclosure, the reception module may include the conversion unit configured to convert the signal received through the antenna, the connection unit including signal lines connected to the conversion unit, and the distribution unit configured to distribute the signals transmitted through the connection unit among the multi-frequency bands which may be processed in the circuit unit.

According to various embodiments of the present disclosure, the conversion unit may include the classification unit configured to classify the signal received through the antenna according to specified intervals, the filtering unit configured to filter the classified signals, and the amplification unit configured to amplify the filtered signals. The classification unit may classify the signal as signals of the high and low intervals or signals of the high, middle, and low intervals. The classification unit may classify the signal as signals of intervals which have the same number as the number of the signal lines. The filtering unit may include the first switch configured to selectively switch the signals included in the intervals according to frequencies, the filter configured to filter the switched signals, respectively, and the second switch configured to selectively provide the filtered signals to the amplification unit. The amplification unit may amplify the filtered signals according to the intervals, respectively.

According to various embodiments of the present disclosure, the signal lines may have a number which is less than the number of the multi-frequency bands which may be processed in the circuit unit. The connection unit may be implemented such that two signal lines of opposite phases correspond to the respective intervals.

According to various embodiments of the present disclosure, a signal receiving apparatus may include a conversion unit configured to convert a signal received through an antenna of an electronic device, a connection unit including a number of signal lines connected to the conversion unit, and a distribution unit configured to distribute signals transmitted through the connection unit among multi-frequency bands which may be processed in an internal circuit of the electronic device. The conversion unit may include a classification unit configured to classify the signal received through the antenna according to specified intervals, a filtering unit configured to filter the classified signals, and an amplification configured to amplify the filtered signals.

According to various embodiments of the present disclosure, a signal processing method may be performed in an electronic device. The signal processing method may include converting a signal received through an antenna, transmitting the converted signal through a number of signal lines, distributing the transmitted signals according to corresponding multi-frequency bands in the electronic device, and processing the distributed signals. The converting of the signal may include classifying the signal received through the antenna according to specified intervals, filtering the classified signals, and amplifying the filtered signals.

According to various embodiments of the present disclosure, an electronic device, which operates in response to the multi-frequency bands, may enhance its space efficiency by reducing the signal lines for electrically connecting the antenna with the internal circuit.

Also, according to various embodiments of the present disclosure, the electronic device may reduce a possibility that an operation error thereof will occur or a possibility that it will deteriorate, and the like by reducing interference or influence with or on peripheral circuits or wires, which may be generated by disposing a plurality of signal lines.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted, or other additional elements may be further included. Also, some of the elements of the electronic device according to various embodiments of the present disclosure may be combined with each other to form one entity, thereby making it possible to perform the functions of the corresponding elements in the same manner as before the combination.

According to various embodiments of the present disclosure, a first electronic device may include a communication module and a control module. The communication module may establish connection between the first electronic device and a second electronic device and may perform data communication between the first electronic device and the second electronic device. The control module may determine whether at least one function may be performed in the second electronic device and may determine a method of performing a function to be performed in at least one of the first electronic device and the second electronic device based on the determination.

The terminology "module" used herein may mean, for example, a unit including one of hardware, software, and firmware or a combination of two or more thereof. The terminology "module" may be interchangeably used with terminologies "unit", "logic", "logical block", "component", "circuit", and the like. The "module" may be a minimum unit of an integrated component or a part thereof. The "module" may be a minimum unit performing one or more functions or a part thereof. The "module" may be implemented mechanically or electronically. For example, the "module" according to various embodiments of the present disclosure may include at least one of an application-specific IC (ASIC) chip, field-programmable gate arrays (FPGAs), or a programmable-logic device for performing certain operations, which are known or to be developed in the future.

A non-transitory computer-readable recording medium according to various embodiments of the present disclosure may include instructions which may be executed by a processor of a first electronic device. The instructions allow the processor to determine whether at least one function may be performed in a second electronic device, to determine a method of performing the function based on the determination, and to perform the function in at least one of the first electronic device and the second electronic device, in the first electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device which operates in response to multi-frequency bands, the electronic device comprising:
   an antenna;
   a reception module configured to amplify a signal received through the antenna and distribute the amplified signal according to the multi-frequency bands, the reception module comprising:
      a conversion unit configured to convert the signal received through the antenna,
      a connection unit including a number of signal lines connected to the conversion unit, and
      a distribution unit configured to distribute signals transmitted through the connection unit among multi-frequency bands which are processed in the circuit unit; and
      a circuit unit configured to process signals included in the multi-frequency bands,
      wherein the conversion unit is configured to filter the signals received through the antenna and amplify the filtered signals.

2. The electronic device of claim 1, wherein the conversion unit comprises:
   a classification unit configured to classify the signal received through the antenna according to specified intervals;
   a filtering unit configured to filter the classified signals; and
   an amplification unit configured to amplify the filtered signals.

3. The electronic device of claim 2, wherein the classification unit classifies the signal as signals of high and low intervals or signals of high, middle, and low intervals according to a frequency range.

4. The electronic device of claim 2, wherein the classification unit classifies the signal as signals of a number of specified intervals, the number of intervals being the same number as the number of the signal lines.

5. The electronic device of claim 2, wherein the filtering unit comprises:
   a first switch configured to selectively switch signals included in the specified intervals according to frequencies;
   a filter configured to filter the switched signals, respectively; and
   a second switch configured to selectively provide the filtered signals to the amplification unit.

6. The electronic device of claim 2, wherein the amplification unit amplifies the filtered signals according to the specified intervals, respectively.

7. The electronic device of claim 1, wherein the number of the signal lines is less than a number of the multi-frequency bands which are processed in the circuit unit.

8. The electronic device of claim 1, wherein the connection unit is implemented such that two signal lines of opposite phases correspond to the respective intervals.

9. A signal receiving apparatus comprising:
   a conversion unit configured to convert a signal received through an antenna of an electronic device;
   a connection unit including a number of signal lines connected to the conversion unit; and
   a distribution unit configured to distribute signals transmitted through the connection unit among multi-frequency bands which are processed in an internal circuit of the electronic device,
   wherein the conversion unit is configured to filter the signals received through the antenna and amplify the filtered signals.

10. The signal receiving apparatus of claim 9, wherein the conversion unit comprises:
    a classification unit configured to classify the signal received through the antenna according to specified intervals;
    a filtering unit configured to filter the classified signals; and
    an amplification unit configured to amplify the filtered signals.

11. The signal receiving apparatus of claim 10, wherein the classification unit classifies the signal as signals of high and low intervals or signals of high, middle, and low intervals according to a frequency range.

12. The signal receiving apparatus of claim 10, wherein the classification unit classifies the signal as signals of a number of specified intervals, the number of intervals being the same number as the number of the signal lines.

13. The signal receiving apparatus of claim 10, wherein the filtering unit comprises:
   a first switch configured to selectively switch signals included in the specified intervals according to frequencies;
   a filter configured to filter the switched signals, respectively; and
   a second switch configured to selectively provide the filtered signals to the amplification unit.

14. The signal receiving apparatus of claim 10, wherein the amplification unit amplifies the filtered signals according to the specified intervals, respectively.

15. The signal receiving apparatus of claim 9, wherein the number of the signal lines is less than a number of the multi-frequency bands which are processed in the circuit unit.

16. The signal receiving apparatus of claim 9, wherein the connection unit is implemented such that two signal lines of opposite phases correspond to the respective intervals.

17. A signal processing method performed in an electronic device, the signal processing method comprising:
   classifying the signal received through the antenna according to specific intervals;
   filtering the classified signals according to the multi-frequency bands;
   amplifying the filtered signals according to the multi-frequency bands;
   transmitting the amplified signals through a number of signal lines;
   distributing the transmitted signals according to corresponding multi-frequency bands in the electronic device; and
   processing the distributed signals.

* * * * *